J. M. SKINNER.
BATTERY SEPARATOR.
APPLICATION FILED DEC. 31, 1914.
1,190,025. Patented July 4, 1916.
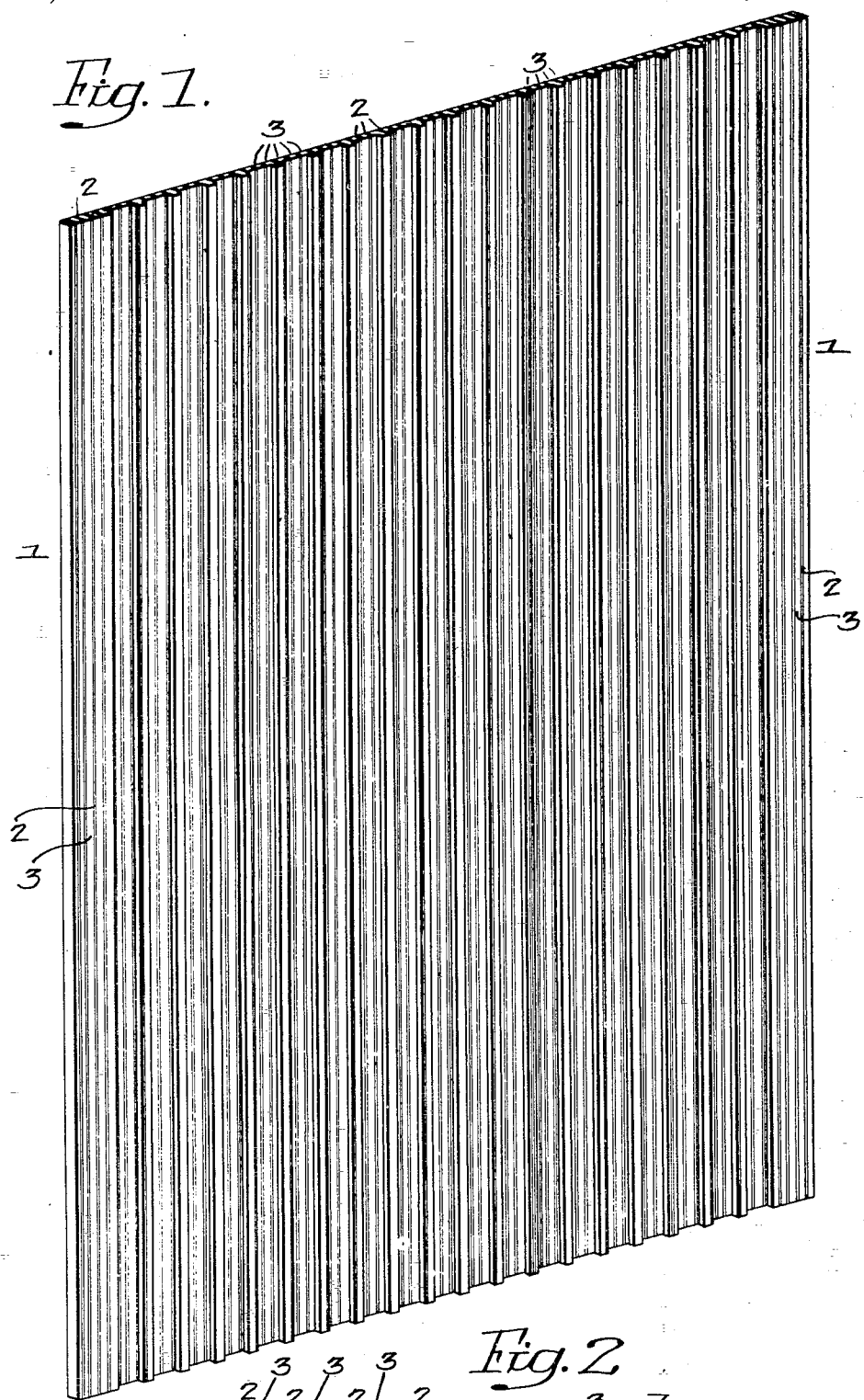
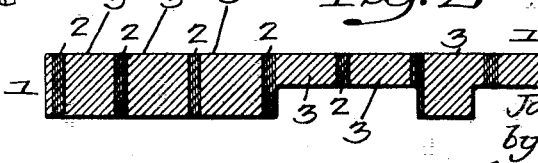

UNITED STATES PATENT OFFICE.

JAMES M. SKINNER, OF PHILADELPHIA, PENNSYLVANIA, ASSIGNOR TO PHILADELPHIA STORAGE BATTERY COMPANY, OF PHILADELPHIA, PENNSYLVANIA, A CORPORATION OF PENNSYLVANIA.

BATTERY-SEPARATOR.

1,190,025.     Specification of Letters Patent.     Patented July 4, 1916.

Application filed December 31, 1914. Serial No. 879,841.

*To all whom it may concern:*

Be it known that I, JAMES M. SKINNER, a citizen of the United States, residing in Philadelphia, Pennsylvania, have invented certain Improvements in Battery-Separators, of which the following is a specification.

One object of this invention is to provide a wooden battery separator of such a nature that its resistance shall be relatively low, the invention contemplating the cutting of the separator plates from logs or pieces of the same in such manner that the portions of the wood which offer a high resistance to the passage of a current will lie in lines substantially parallel with the direction of the current flow, being alternated throughout the plate structure with portions of relatively low resistance.

This object and other advantageous ends I secure as hereinafter set forth, reference being had to the accompanying drawings, in which, Figure 1 is a perspective view of a battery separator constructed according to my invention, and Fig. 2 is a fragmentary transverse section on an enlarged scale illustrating the interior structure of the plate shown in Fig. 1.

Wood as commonly used for the manufacture of battery separators, and particularly that of a dense texture, consists of alternate layers of dense or compact and relatively porous or open material due to the annular growth of the tree. If in the manufacture of separators the wood be so cut that one or more of the dense layers lie parallel with the plane of the faces or at an acute angle thereto, it will be understood that these dense layers will largely determine the electrical resistance of the plate which will be relatively high according to the density and composition of the dense layers and also depending upon the number of layers of such material in the plate.

My invention consists in forming a battery separator by quarter sawing, or otherwise so cutting the logs or pieces of timber that the annual growth rings lie in said separator substantially at right angles to the plane thereof. The structure 1, so made has the relatively dense but thin annual growth laminations 2 which are perpendicular to the plane of the plate, alternated with relatively thick laminations 3 of comparatively porous material, so that an electric current in passing through the plate or rather through the electrolyte with which it is saturated, is free to follow the shortest possible path which is likewise that of minimum resistance. While my invention contemplates the use of any desired wood which may be available for the purpose, I have found it particularly applicable to such woods as yellow pine, fir, cedar and other coniferous woods of dense texture.

I claim:—

1. A battery separator consisting of a wooden plate in which the natural laminations lie in planes substantially at right angles to its plane.

2. A battery separator consisting of alternated layers of relatively high and low resistance materials extending in planes substantially at right angles to the plane of the separator.

3. A battery separator consisting of alternated layers of relatively high and low resistance materials extending in planes substantially at right angles to the plane of the separator, the low resistance layers being thicker than those of the high resistance material.

In testimony whereof, I have signed my name to this specification, in the presence of two subscribing witnesses.

JAMES M. SKINNER.

Witnesses:
WILLIAM E. BRADLEY,
WM. A. BARR.